US011894614B2

(12) United States Patent
So et al.

(10) Patent No.: US 11,894,614 B2
(45) Date of Patent: Feb. 6, 2024

(54) ANTENNA APPARATUS

(71) Applicants: SAMSUNG ELECTRO-MECHANICS CO., LTD., Suwon-si (KR); Research & Business Foundation SUNGKYUNKWAN UNIVERSITY, Suwon-si (KR)

(72) Inventors: Won Wook So, Suwon-si (KR); Jeongki Ryoo, Suwon-si (KR); Woncheol Lee, Suwon-si (KR); Youngsik Hur, Suwon-si (KR); Keum Cheol Hwang, Suwon-si (KR); Nam Heung Kim, Suwon-si (KR); Yong-serk Kim, Suwon-si (KR)

(73) Assignees: Samsung Electro-Mechanics Co., Ltd., Suwon-si (KR); Research & Business Foundation SUNGKYUNKWAN UNIVERSITY, Suwon-si (KR)

(*) Notice: Subject to any disclaimer, the term of this patent is extended or adjusted under 35 U.S.C. 154(b) by 275 days.

(21) Appl. No.: 17/231,345

(22) Filed: Apr. 15, 2021

(65) Prior Publication Data

US 2022/0123479 A1 Apr. 21, 2022

(30) Foreign Application Priority Data

Oct. 16, 2020 (KR) ........................ 10-2020-0134152

(51) Int. Cl.
*H01Q 21/06* (2006.01)
*H01Q 5/371* (2015.01)
*H01Q 9/04* (2006.01)

(52) U.S. Cl.
CPC ........... *H01Q 21/065* (2013.01); *H01Q 5/371* (2015.01); *H01Q 9/0421* (2013.01)

(58) Field of Classification Search
CPC .... H01Q 21/065; H01Q 5/371; H01Q 9/0421; H01Q 1/243; H01Q 1/48; H01Q 5/378;
(Continued)

(56) References Cited

U.S. PATENT DOCUMENTS

2017/0054217 A1* 2/2017 Hashimoto .......... H01Q 9/0407
2018/0054006 A1 2/2018 Wang
(Continued)

FOREIGN PATENT DOCUMENTS

KR 10-2005-0069746 A 7/2005
KR 10-2019-0029402 A 3/2019
KR 10-2160966 B1 9/2020

OTHER PUBLICATIONS

Liu, Shih-Ting, Yao-Wen Hsu, and Yi-Cheng Lin. "A dual polarized cavity-backed aperture antenna for 5G mmW MIMO applications." 2015 IEEE International Conference on Microwaves, Communications, Antennas and Electronic Systems (COMCAS). IEEE, 2015 (5 pages in English).
(Continued)

*Primary Examiner* — Graham P Smith
*Assistant Examiner* — Michael M Bouizza
(74) *Attorney, Agent, or Firm* — NSIP Law

(57) ABSTRACT

An antenna apparatus includes: a ground plane including first sides parallel to a first direction and second sides parallel to a second direction, on a plane formed in the first and second directions; a dielectric layer disposed on the ground plane in a third direction; an antenna patch overlapping the ground plane in the third direction; and vias connected to the ground plane and passing through at least a portion of the dielectric layer. Edges of the vias at least partially overlap the first sides of the ground plane in the third direction.

20 Claims, 29 Drawing Sheets

(58) Field of Classification Search
CPC ...... H01Q 21/08; H01Q 21/28; H01Q 9/0414; H01Q 1/50; H01Q 9/0407
See application file for complete search history.

(56) References Cited

U.S. PATENT DOCUMENTS

| | | | | |
|---|---|---|---|---|
| 2019/0165475 | A1* | 5/2019 | Shibata | H01Q 1/48 |
| 2020/0067178 | A1* | 2/2020 | Hu | H01Q 1/48 |
| 2020/0303821 | A1* | 9/2020 | Lee | H01Q 5/335 |
| 2020/0395679 | A1* | 12/2020 | Lim | H01Q 1/243 |

OTHER PUBLICATIONS

Jeong, Hae-Young, et al. "Design of Dual-Band, Dual-Polarized Microstrip Patch Antenna with Two Input Ports." The Journal of Korean Institute of Electromagnetic Engineering and Science 16.11 (2005): 1164-1170 (7 pages in Korean).

Parchin, Naser Ojaroudi, et al. "Eight-element dual-polarized MIMO slot antenna system for 5G smartphone applications." IEEE access 7 (2019): 15612-15622 (11 pages in English).

* cited by examiner

ANTENNA APPARATUS

CROSS-REFERENCE TO RELATED APPLICATIONS

This application claims the benefit under 35 U.S.C. § 119(a) of Korean Patent Application No. 10-2020-0134152 filed in the Korean Intellectual Property Office on Oct. 16, 2020, the entire disclosure of which is incorporated herein by reference for all purposes.

BACKGROUND

1. Field

The following description relates to an antenna apparatus.

2. Description of the Related Art

Millimeter wave (mmWave) communication including 5th generation (5G) communication is currently being researched, and studies for commercializing/standardizing an antenna apparatus for effectively implementing 5G communication are being conducted. In 5G communication, the need for a multi-bandwidth antenna for transmitting and receiving RF signals in various bandwidths with is increasing.

Meanwhile, as portable electronic device technology has evolved, a size of a screen providing a display area of a portable electronic device has increased. Accordingly, a size of a bezel surrounding the screen and accommodating an antenna has decreased, and, thus, a size of an area in which the antenna can be installed has also decreased.

The above information disclosed in this Background section is only for enhancement of understanding of the background of the described technology, and therefore it may contain information that does not form the prior art that is already known to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an antenna apparatus includes: a ground plane including first sides parallel to a first direction and second sides parallel to a second direction, on a plane formed in the first and second directions; a dielectric layer disposed on the ground plane in a third direction; an antenna patch overlapping the ground plane in the third direction; and vias connected to the ground plane and passing through at least a portion of the dielectric layer. Edges of the vias at least partially overlap the first sides of the ground plane in the third direction.

A length of each of the first sides in the first direction may be greater than a length of each of the second sides in the second direction. The vias may be disposed to be adjacent to portions at which the first and second sides of the ground plane cross each other.

The vias may not overlap the antenna patch along the third direction.

The antenna patch may include: a first antenna patch disposed on the dielectric layer along the third direction; a second antenna patch overlapping the first antenna patch in the third direction; and a third antenna patch disposed on a same layer as the second antenna patch and disposed around the second antenna patch. The plurality of vias may not overlap the first antenna patch and the second antenna patch in the third direction.

The antenna apparatus may further include: a first feed via and a second feed via that pass through at least a portion of the dielectric layer in the third direction and are spaced apart from a center of the ground plane in the second direction and the first direction. The antenna apparatus may be configured such that a first signal having a first polarization is transmitted and received by an electrical signal applied to the first feed via, and a second signal having a second polarization is transmitted and received by an electrical signal applied to the second feed via.

The antenna apparatus may further include: a plurality of first vias connected to the ground plane, passing through at least a portion of the dielectric layer, and disposed to be spaced apart from the plurality of vias in a direction parallel to the first direction.

Edges of the plurality of first vias may at least partially overlap the first sides of the ground plane in the third direction.

The antenna patch may include: a first antenna patch disposed on the dielectric layer in the third direction; a second antenna patch overlapping the first antenna patch along in third direction; and a third antenna patch disposed on a same layer as the second antenna patch and disposed around the second antenna patch. The plurality of first vias may not overlap the first antenna patch and the second antenna patch in the third direction.

The plurality of first vias may at least partially overlap the third antenna patch in the third direction.

A first distance between the plurality of vias and the plurality of first vias in a direction parallel to the first direction may not be greater than a minimum distance between the plurality of first vias and the antenna patch in the direction parallel to the first direction.

The dielectric layer may include a first edge parallel to the first direction and a second edge parallel to the second direction. A width of the first edge may be greater than a width of the second edge.

In another general aspect, antenna apparatus includes: a ground plane including first sides parallel to a first direction and second sides parallel to a second direction, on a plane formed in the first and second directions; a dielectric layer overlapping the ground plane in a third direction; an antenna patch overlapping the ground plane in the third direction; a plurality of first vias passing through at least a portion of the dielectric layer and connected to the ground plane; and a plurality of second vias disposed to be spaced apart from the plurality of first vias in the first direction. A first distance between the plurality of first vias and the plurality of second vias in a direction parallel to the first direction is not greater than a minimum distance between the plurality of second vias and the antenna patch in the direction parallel to the first direction.

Edges of the plurality of first vias may at least partially overlap the first sides of the ground plane in the third direction.

Edges of the plurality of second vias may at least partially overlap the first sides of the ground plane in the third direction.

The plurality of first vias may not overlap the antenna patch in the third direction.

The antenna apparatus may further include: a first feed via and a second feed via that pass through at least a portion of the dielectric layer in the third direction and are spaced from a center of the ground plane in the second direction and the first direction. The antenna patch may include: a first antenna patch coupled with the first feed via and the second feed via; a second antenna patch overlapping the first antenna patch in the third direction; and a third antenna patch disposed on a same layer as the second antenna patch and disposed around the second antenna patch. The plurality of first vias may not overlap the first antenna patch and the second antenna patch in the third direction. The plurality of second vias may not overlap the first antenna patch and the second antenna patch in the third direction.

The plurality of second vias may at least partially overlap the third antenna patch in the third direction.

The dielectric layer may include a first edge parallel to the first direction and a second edge parallel to the second direction. A width of the first edge may be greater than a width of the second edge. A length of each of the first sides in the first direction may be longer than a length of each of the second sides in the second direction.

The antenna apparatus may further include: a first feed via and a second feed via that pass through at least a portion of the dielectric layer in the third direction and are spaced from a center of the ground plane in the second direction and the first direction. The antenna apparatus may be configured such that a first signal having a first polarization is transmitted and received by an electrical signal applied to the first feed via, and a second signal having a second polarization is transmitted and received by an electrical signal applied to the second feed via.

A number of the plurality of first vias and a number of the plurality of second vias may be the same.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
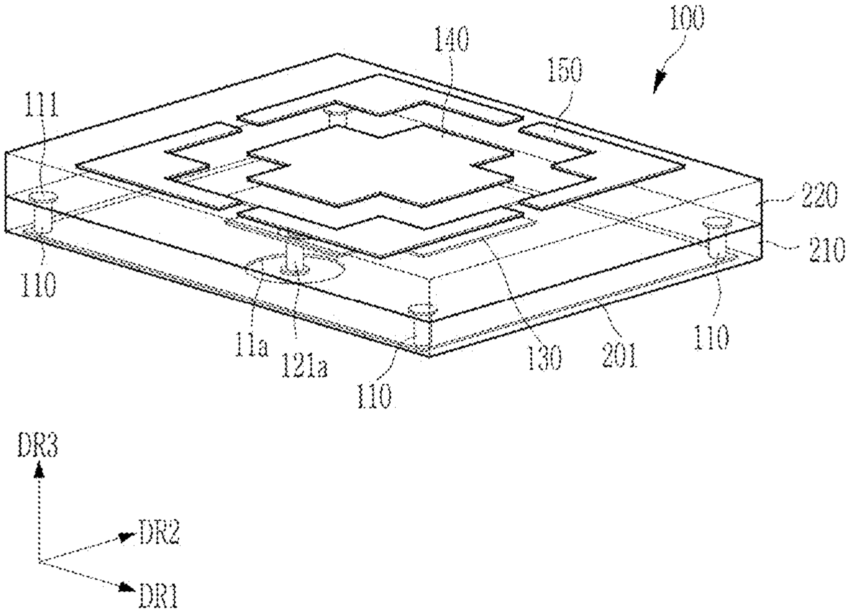
FIG. 1 is a perspective view of an antenna apparatus, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed, as will be apparent after gaining an understanding of this disclosure, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term “may” with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being “on,” “connected to,” or “coupled to” another element, it may be directly “on,” “connected to,” or “coupled to” the other element, or there may be one or more other elements intervening therebetween. In contrast, when an element is described as being “directly on,” “directly connected to,” or “directly coupled to” another element, there can be no other elements intervening therebetween.

As used herein, the term “and/or” includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

Further, in the drawings, the size and thickness of each element are arbitrarily illustrated for ease of description, and the present disclosure is not necessarily limited to those illustrated in the drawings. In the drawings, the thicknesses of layers, films, panels, regions, areas etc., are exaggerated for clarity. In the drawings, for ease of description, the thicknesses of some layers and areas are exaggerated.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

Figure 2:
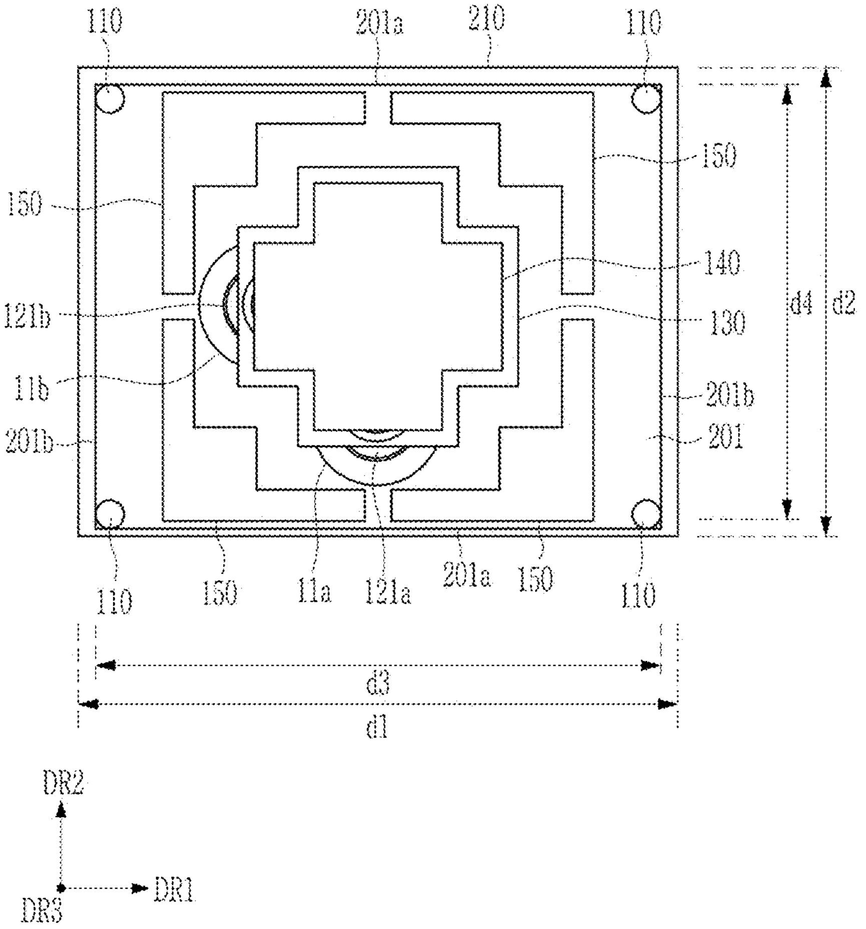
FIG. 2 is a top plan view of the antenna apparatus of FIG. 1.
Figure 3:
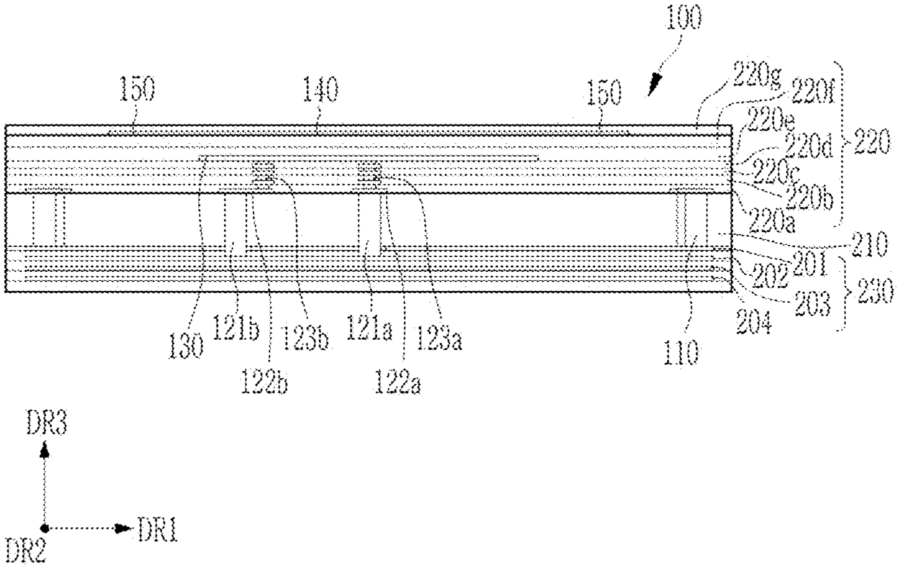
FIG. 3 is a cross-sectional view of the antenna apparatus of FIG. 1.
Figure 4:
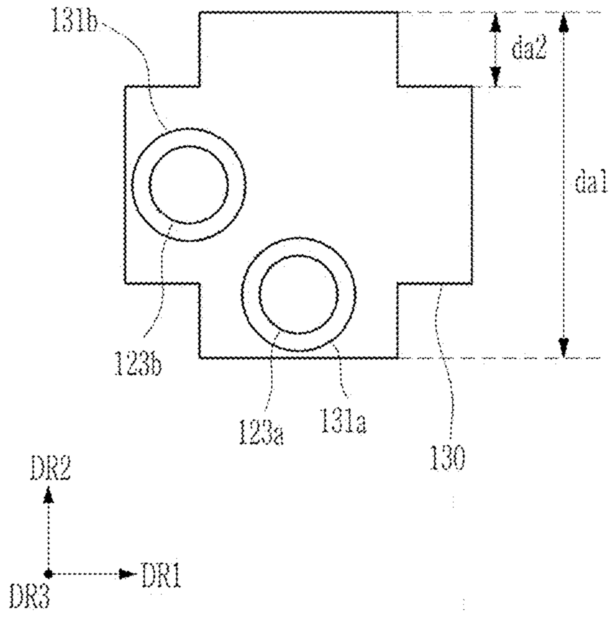
FIG. 4 is a top plan view of a portion of the antenna apparatus of FIG. 1.
Figure 5:
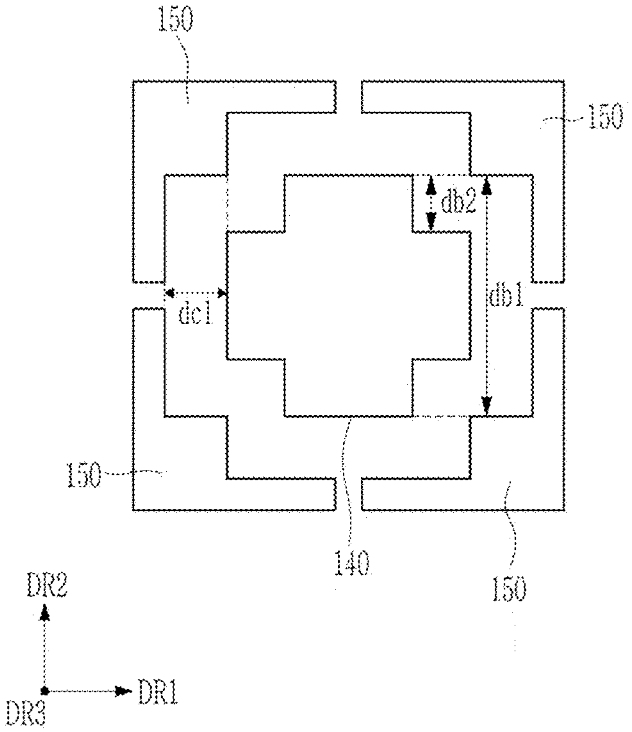
FIG. 5 is a top plan view of a portion of the antenna apparatus of FIG. 1.
Figure 6:
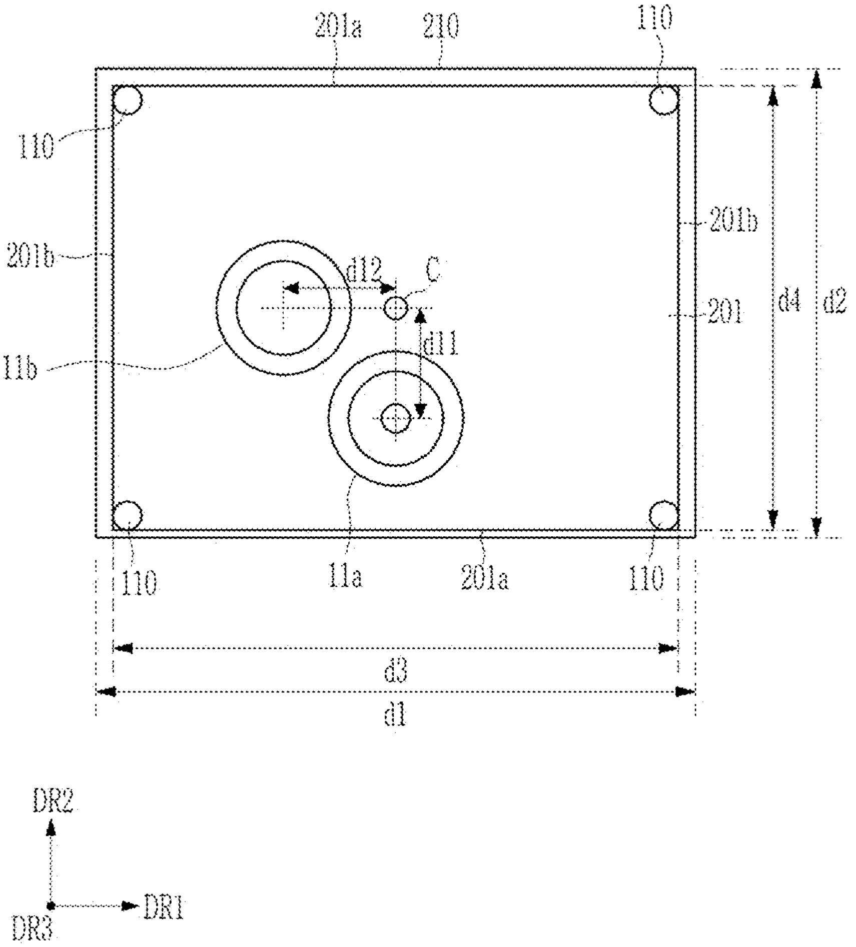
FIG. 6 is a top plan view of a portion of the antenna apparatus of FIG. 1.

FIGS. to 6, illustrate an antenna apparatus 100, according to an embodiment. FIG. 1 illustrates a perspective view of the antenna apparatus 100. FIG. 2 illustrates a top plan view of the antenna apparatus 100. FIG. 3 illustrates a cross-sectional view of the antenna apparatus 100. FIG. 4 illustrates a top plan view of a portion of the antenna apparatus 100. FIG. 5 illustrates a top plan view of a portion of the antenna apparatus 100. and FIG. 6 illustrates a top plan view of a portion of the antenna apparatus 100.

Referring to FIGS. 1 and 2, the antenna apparatus 100 may include, for example, a first feed via 121*a*, a second feed via 121*b*, a first antenna patch 130, a second antenna patch 140, a third antenna patch 150, and a plurality of first vias 110.

The antenna apparatus 100 may further include: a plane formed in a first direction DR1 and a second direction DR2; a first dielectric layer 210 extending in a third direction DR3 orthogonal to the first direction DR1 and the second direction DR2; a second dielectric layer 220 disposed on (e.g., above) the first dielectric layer 210 in the third direction DR3; and a ground plane 201 disposed under the first dielectric layer 210 in the third direction DR3.

The first dielectric layer 210 may have a dielectric constant of 3.55, a loss tangent of 0.004, and a thickness of 400 μm, but is not limited thereto. The second dielectric layer 220 may include a plurality of layers made of a prepreg dielectric having a dielectric constant of 3.55 and a loss tangent of 0.004, but is not limited thereto.

The first antenna patch 130, the second antenna patch 140, and the third antenna patch 150 may be disposed between a plurality of layers forming the second dielectric layer 220. The first antenna patch 130 and the second antenna patch 140 overlap each other in the third direction DR3; and the third antenna patch 150 may be disposed on the same layer as the second antenna patch 140 and disposed at a side of the second antenna patch 140 such that the third antenna patch 150 surrounds the second antenna patch 140. The first antenna patch 130 may be a driven patch, the second antenna patch 140 may be a director, and the third antenna patch 150 may be a parasitic patch, but the first antenna patch 130, the second antenna patch 140, and the third antenna patch 150 are not limited to this configuration.

As shown in FIG. 2, the first dielectric layer 210 may have a first width d1 in the first direction DR1 and a second width d2 in the second direction DR2, and the first width d1 may be greater than the second width d2. Similarly, the ground plane 201 may have a third width d3 in the first direction DR1 and a fourth width d4 in the second direction DR2, and the third width d3 may be greater than the fourth width d4.

The plurality of first vias 110 are connected to the ground plane 201.

On one plane formed in the first direction DR1 and the second direction DR2, the plurality of first vias 110 may be disposed to be adjacent to four vertices of the ground plane 201. For example, the plurality of first vias 110 may be disposed to be adjacent to corner portions formed by two first sides 201*a* of the ground plane 201 parallel to the first direction DR1 and two second sides 201*b* of the ground plane 201 parallel to the second direction DR2.

Edges of the plurality of first vias 110 may at least partially overlap the first side 201*a* of the ground plane 201 in the third direction DR3. In addition, the edges of the plurality of first vias 110 may at least partially overlap the second side 201*b* of the ground plane 201 in the third direction DR3.

The plurality of first vias 110 may not overlap the antenna patches 130, 140, and 150 in the third direction DR3.

The plurality of first vias 110 pass through the first dielectric layer 210, and may include first extensions 111 that are connected to upper portions of the plurality of first vias 110 to be disposed on the first dielectric layer 210.

The first feed via 121*a* and the second feed via 121*b* may penetrate at least a portion of the first dielectric layer 210 and the second dielectric layer 220. In addition, the first feed via 121*a* and the second feed via 121*b* are not connected to the ground plane 201 through a first hole 11*a* and a second hole 11*b* formed in the ground plane 201, and may pass through the ground plane 201.

Referring to FIGS. 1 to 3, the second dielectric layer 220 is disposed on the first dielectric layer 210 in the third direction DR3, and the second dielectric layer 220 may include a first layer 220*a*, a second layer 220*b*, a third layer 220*c*, a fourth layer 220*d*, a fifth layer 220*e*, sixth layer 220*f*, and a seventh layer 220*g* that are sequentially disposed in the third direction DR3.

The first feed via 121*a* and the second feed via 121*b* penetrate through the first dielectric layer 210, and are respectively connected to a first feed pattern 122*a* and a second feed pattern 122*b* disposed on the first dielectric layer 210. The first feed pattern 122*a* and the second feed pattern 122*b* are connected to the third feed pattern 123*a* and the fourth feed pattern 123*b*, respectively, that are extended from the first feed via 121*a* and the second feed via in 121*b* in the third direction DR3 to pass through the first layer 220*a*, the second layer 220*b*, the third layer 220*c*, and the fourth layer 220*d* of the second dielectric layer 220.

Referring to FIGS. 3 and 4, upper surfaces of the third feed pattern 123*a* and the fourth feed pattern 123*b* may be respectively disposed within a third hole 131*a* and a fourth hole 131*b* formed in the first antenna patch 130, whereby the third feed pattern 123*a* and the fourth feed pattern 123*b* may be disposed on a side surface of the first antenna patch 130 to overlap the first antenna patch 130 laterally on a plane formed in the first direction DR1 and the second direction DR2.

The first feed pattern 122*a* and the second feed pattern 122*b* disposed on the first dielectric layer 210 may be respectively connected to the first feed via 121*a* and the second feed via 121*b* to receive an electrical signal from the first feed via 121*a* and the second feed via 121*b*, respectively. The third feed pattern 123*a* may be connected to the first feed pattern 122*a* to receive an electrical signal through the first feed via 121*a*, and the first feed pattern 122*a*. The fourth feed pattern 123*b* may be connected to the second feed pattern 122*b* to receive an electrical signal through the second feed via 121*b* and the second feed pattern 122*b*.

When an electrical signal is applied to the third feed pattern 123*a* and the fourth feed pattern 123*b*, the third feed pattern 123*a* and the fourth feed pattern 123*b* are coupled with the first antenna patch 130 to transmit the electrical signal to the first antenna patch 130. A method in which the first antenna patch 130 and the third feed pattern 123*a* and fourth feed pattern 123*b* are separated from each other and coupled with each other to feed power is referred to as a capacitive coupled feed method.

A planar shape of the first antenna patch 130 may be a polygonal shape in which four corner portions of a quadrangle are removed in a quadrangular shape. For example, the first antenna patch 130 may have a polygonal planar shape having twelve corners formed by removing quadrangular portions of a second length da2 from four vertices of a quadrangle with one side of a first length da1. The second length da2 may be equal to or less than about ¼ of the first length da1. As such, since the first antenna patch 130 has a polygonal planar shape, a length of a path of current flowing along an edge of the first antenna patch 130 may increase, and a sufficient current path may be secured without increasing a size of the first antenna patch 130, such that strength of an RF signal by current may be increased.

Referring to FIG. 5 together with FIG. 3, the second antenna patch 140 and the third antenna patch 150 are disposed on the fifth layer 220*e* of the second dielectric layer 220, and the second antenna patch 140 overlaps the first antenna patch 130 in the third direction DR3.

When an electrical signal is transmitted to the first antenna patch 130, the first antenna patch 130 and the second antenna patch 140 are coupled, and the electrical signal is transmitted to the second antenna patch 140 by the coupling.

Similar to that of the first antenna patch 130, a planar shape of the second antenna patch 140 may be a polygonal shape in which four corner portions of a quadrangle are removed in a quadrangular shape. For example, the second antenna patch 140 may have a planar shape having twelve corners formed by removing quadrangular portions of a second length db2 from four corners of a quadrangle with one side of a first length db1. The second length db2 may be equal to or less than about ¼ of the first length db1. As such, since the second antenna patch 140 has a polygonal planar shape, a length of a path of current flowing along an edge of the second antenna patch 140 may increase, and a sufficient current path may be secured without increasing a size of the second antenna patch 140, such that strength of an RF signal by the current may be increased.

The third antenna patch 150 is disposed around the second antenna patch 140 to surround the second antenna patch 140, and the second antenna patch 140 and the third antenna patch 150 together form a substantially quadrangular planar shape. The second antenna patch 140 and the third antenna patch 150 may be spaced apart from each by a constant distance dc1.

The third antenna patch 150 forms an additional coupling with the second antenna patch 140, whereby the second antenna patch 140 and the third antenna patch 150 may form additional impedances, so that bandwidths of the antenna patches 130 and 140 may be increased in size without increasing a size of the second antenna patch 140.

The first antenna patch 130, the second antenna patch 140, and the third antenna patch 150 may transmit RF signals by receiving electrical signals through the first feed via 121*a* and the second feed via 121*b*, the first feed pattern 122*a* and the second feed pattern 122*b*, and the third feed pattern 123*a* and the fourth feed pattern 123*b*.

The antenna apparatus 100 may transmit and receive a first RF signal, having a first polarization, through an electrical signal applied by the first feed via 121*a*, and may transmit and receive a second RF signal, having a second polarization, through an electrical signal applied by the second feed via 121*b*. For example, the first polarization of the first RF signal may be vertical polarization, and the second polarization of the second RF signal may be horizontal polarization.

Referring to FIG. 6, the first feed via 121*a* is spaced apart from a center C of the ground plane 201 in the second direction DR2, the second feed via 121*b* is spaced apart from the center C of the ground plane 201 in the first direction DR1, and a distance d11 (in a direction parallel to the second direction DR2) from the center C of the ground plane 201 to a center of the first feed via 121*a* may be substantially the same as a distance d12 (in a direction parallel to the first direction DR1) from the center C of the ground plane 201 to a center of the second feed via 121*b*. In addition, an imaginary line connecting the center C of the ground plane 201 and the center of the first feed via 121*a* and an imaginary line connecting the center C of the ground plane 201 and the center of the second feed via 121*b* may be perpendicular to each other. By disposing the first feed via 121*a* and the second feed via 121*b*, which transmit RF signals of different polarizations, in the described configuration, influence between the RF signals of different polarizations may be reduced.

The antenna apparatus 100 is mounted on an electronic device, and due to a size of a bezel of the electronic device being decreased, the antenna apparatus 100 is mounted on a side surface of the bezel rather than a front surface of the electronic device. As a thickness of the electronic device becomes thinner, a thickness of the side surface of the bezel on which the antenna apparatus 100 is mounted also becomes thinner, whereby a width of the second direction DR2 of the antenna apparatus 100 may be reduced.

As described above, the width of the antenna apparatus 100 in the second direction DR2 decreases, and, accordingly, the second width d2 of the first dielectric layer 210 parallel to the second direction DR2 may be less than the first width d1 of the first dielectric layer 210 parallel to the first direction DR1.

In addition, similarly, the fourth width d4 of the two second sides 201*b* of the ground plane 201 parallel to the second direction DR2 may be less than the third width d3 of the two first sides 201*a* of the ground plane 201 parallel to the first direction DR1.

The ground plane 201 functions as a reflector for electrical signals transmitted to the antenna patches 130, 140, and 150.

The first feed via 121*a* is disposed to be adjacent to an edge of the first dielectric layer 210 that is parallel to the first direction DR1, and the second feed via 121*b* is disposed to be adjacent to an edge of the first dielectric layer 210 that is parallel to the second direction DR2, whereby the electrical signal applied through the first feed via 121*a* may be propagated in a direction substantially parallel to the second direction DR2, and the electrical signal applied through the second feed via 121*b* may propagate in a direction substantially parallel to the first direction DR1. Accordingly, a first return current path of the ground plane 201 for the electrical signal applied to the first feed via 121*a* may be substantially parallel to the second direction DR2, and a second return current path of the ground plane 201 for the electrical signal applied to the second feed via 121*b* may be substantially parallel to the first direction DR1.

As described above, as the width of the second direction DR2 of the antenna apparatus 100 decreases, since the fourth width d4 of the ground plane 201 parallel to the second direction DR2 is less than the third width d3 of the ground plane 201 parallel to the first direction DR1, the first return current path of the ground plane 201 for the electrical signal applied to the first feed via 121*a* may be shortened compared to the second return current path of the ground plane 201 for the electrical signal applied to the second feed via 121*b*. Therefore, a reflection coefficient characteristic of the first polarization RF signal of the antenna apparatus 100 may be lowered, and thereby a bandwidth of the first polarization RF signal of the antenna apparatus 100 may be lowered.

However, the antenna apparatus 100 includes a plurality of first vias 110, and the plurality of first vias 110 are connected to the ground plane 201. Accordingly, the plurality of first vias 110 may provide a first return current path of an additional ground plane 201.

The plurality of first vias 110 may be disposed adjacent to corner portions formed by the two first sides 201*a* of the ground plane 201 parallel to the first direction DR1 and the two second sides 201*b* parallel to the second direction DR1 of the ground plane 201 crossing each other, and the edges of the plurality of first vias 110 may at least partially overlap the first side 201*a* of the ground plane 201 in the third direction DR3.

As such, the plurality of first vias 110 are arranged so that their edges at least partially overlap the sides of the ground plane 201 at the four corner portions of the ground plane 201, and thus an additional first return current path through two first vias 110 facing each other along the second direction DR2 and the ground plane 201 may be lengthened.

In addition, since the plurality of first vias 110 are arranged so that their edges at least partially overlap the sides of the ground plane 201 at the four corner portions of the ground plane 201, the spacing distance between the plurality of first vias 110 and the antenna patches 130, 140, and 150 is widened, and, accordingly, the influence due to the additional coupling between the plurality of first vias 110 and the antenna patches 130, 140, and 150 may be reduced. Thus, the effect of the additional coupling on the resonance pattern of the antenna apparatus 100 may be reduced.

If the edges of the plurality of first vias 110 were to be disposed to be spaced apart from the edge of the ground plane 201 by a certain distance so that the edges of the plurality of first vias 110 do not overlap the side of the ground plane 201, the distance between the two first vias 110 facing each other along the second direction DR2 would be narrow, and, accordingly, the additional first return current path through the first vias 110 and the ground plane 201 would also be shortened.

In addition, if the plurality of first vias 110 were to be disposed to be spaced apart from the edge of the ground plane 201 by a predetermined interval so that the edges of the first vias 110 do not overlap the sides of the ground plane 201 at the four corner portions of the ground plane 201, the spacing distance between the plurality of first vias 110 and the antenna patches 130, 140, and 150 would be relatively narrowed, and thus the resonance pattern of the antenna apparatus 100 would be affected by the effect due to the additional coupling between the plurality of first vias 110 and the antenna patches 130, 140, and 150.

However, as described above, since the antenna apparatus 100 includes the plurality of first vias 110 disposed so that their edges at least partially overlap the sides of the ground plane 201 at the four corner portions of the ground plane 201, the antenna apparatus 100 provides an additional return current path to the first polarization RF signal having a relatively short return current path to be able to prevent a bandwidth reduction of the first polarization RF signal of the antenna apparatus 100, and reduces the effect of the additional coupling between the plurality of first vias 110 and the antenna patches 130, 140, and 150 to be able to prevent performance degradation of the antenna apparatus 100 due to change in the resonance pattern of the antenna apparatus 100.

Referring back to FIG. 3, the antenna apparatus 100 may further include a third dielectric layer 230 disposed below the first dielectric layer 210 in the third direction DR3, and the third dielectric layer 230 may include a plurality of layers. The antenna apparatus 100 may further include a ground plane 201, feed layers 202 and 203, and a conductive layer 204 disposed between the plurality of layers of the third dielectric layer 230. Layers disposed below the first dielectric layer 210 of the antenna apparatus 100 may be changed according to design.

Figure 7:
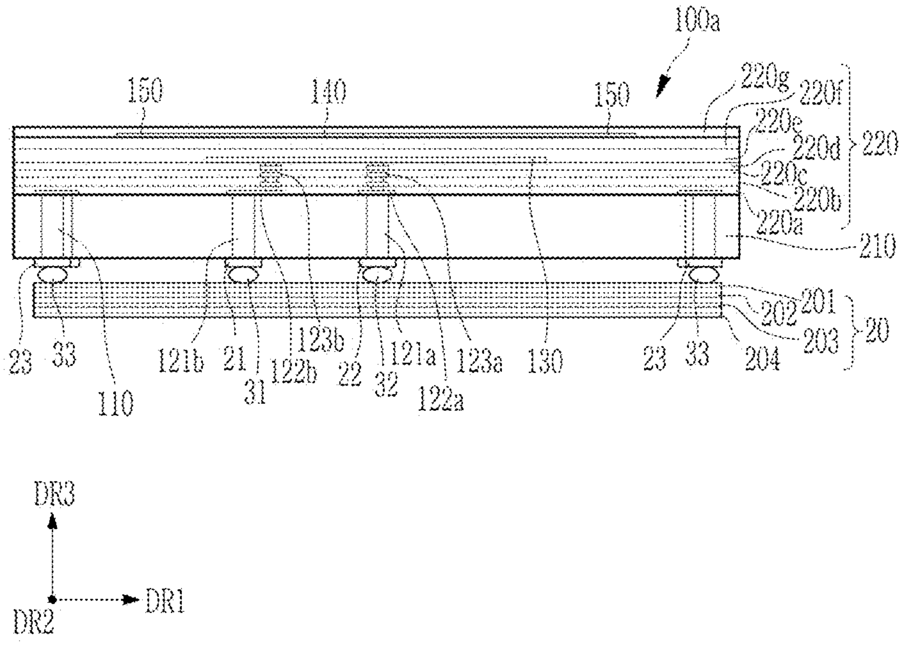
FIG. 7 is a cross-sectional view of an antenna apparatus, according to another embodiment.

FIG. 7 illustrates an antenna apparatus 100*a*, according to another embodiment. In the description of the antenna apparatus 100*a*, detailed descriptions of the same constituent elements as those of the antenna apparatus 100 according to the above-described embodiment will be omitted.

Referring to FIG. 7, the antenna apparatus 100*a* may include, for example, a plurality of pads 21, 22, and 23 disposed under the first feed via 121*a*, the second feed via 121*b*, and the plurality of first vias 110, and a plurality of connection members 31, 32, and 33 disposed under the plurality of pads 21, 22, and 23. The plurality of connection members 31, 32, and 33 may be solder balls, pins, or lands.

The antenna apparatus 100*a* may further include a connection substrate 20 that is disposed under the first dielectric layer 210 in the third direction DR3 and includes the ground plane 201.

The first feed via 121*a*, the second feed via 121*b*, and the plurality of first vias 110 may be electrically connected to the connection substrate 20 through the plurality of pads 21, 22, and 23 and the plurality of connection members 31, 32, and 33.

Unlike the antenna apparatus 100, the antenna apparatus 100*a* of FIGS. 1 to 6 may have an independent structure separate from the connection member 20 including the ground plane 201.

Generally, features of the antenna apparatus 100 described above with reference to FIGS. 1 to 6 are applicable to the antenna apparatus 100*a*, with the exception that, in the antenna apparatus 100*a*, the configuration of the connection substrate 20, the plurality of connection members 31, 32, and 33, and the plurality of pads 21, 22, and 23 described above replaces the configuration of the third dielectric layer 230 of the antenna apparatus 100.

Figure 8:
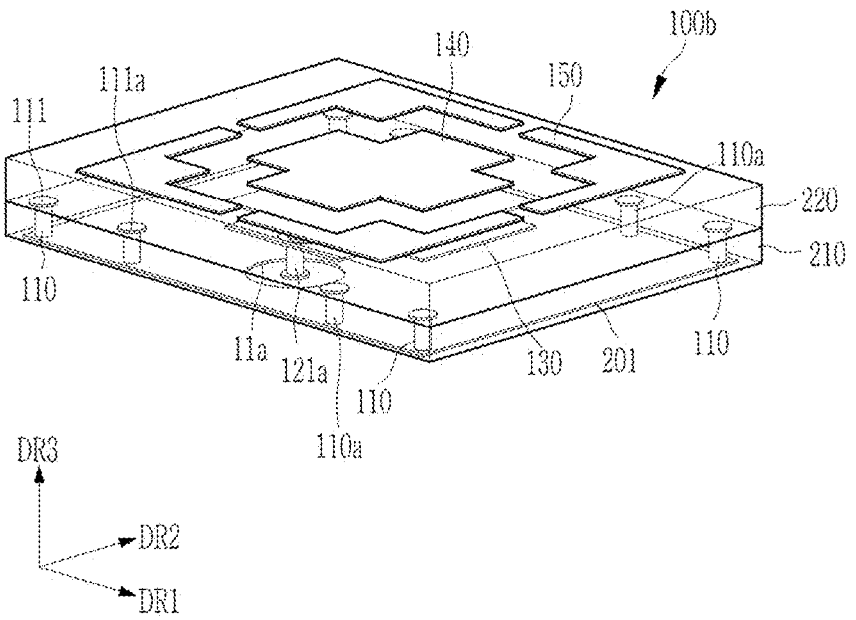
FIG. 8 is a perspective view of an antenna apparatus, according to another embodiment.
Figure 9:
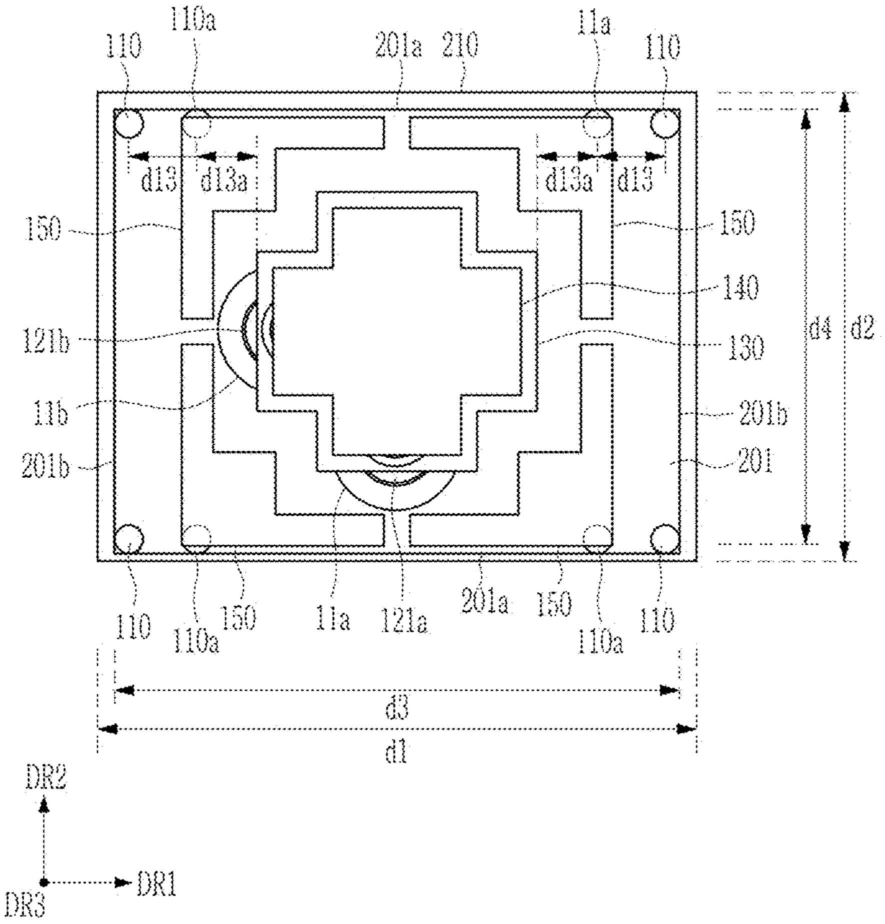
FIG. 9 is a top plan view of the antenna apparatus of FIG. 8.
Figure 10:
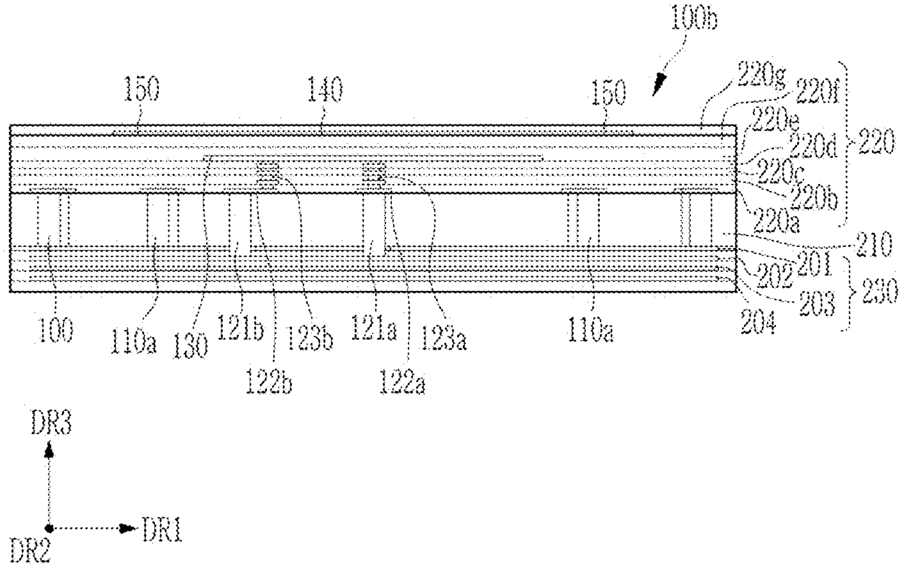
FIG. 10 is a cross-sectional view of the antenna apparatus of FIG. 8.
Figure 11:
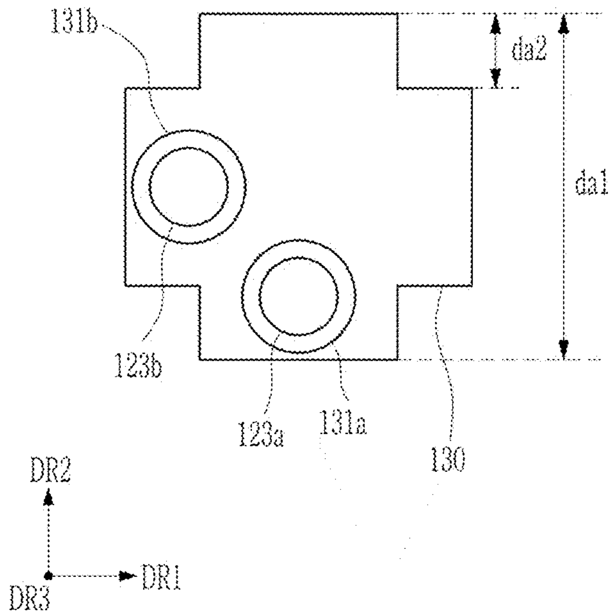
FIG. 11 is a top plan view of a portion of the antenna apparatus of FIG. 8.
Figure 12:
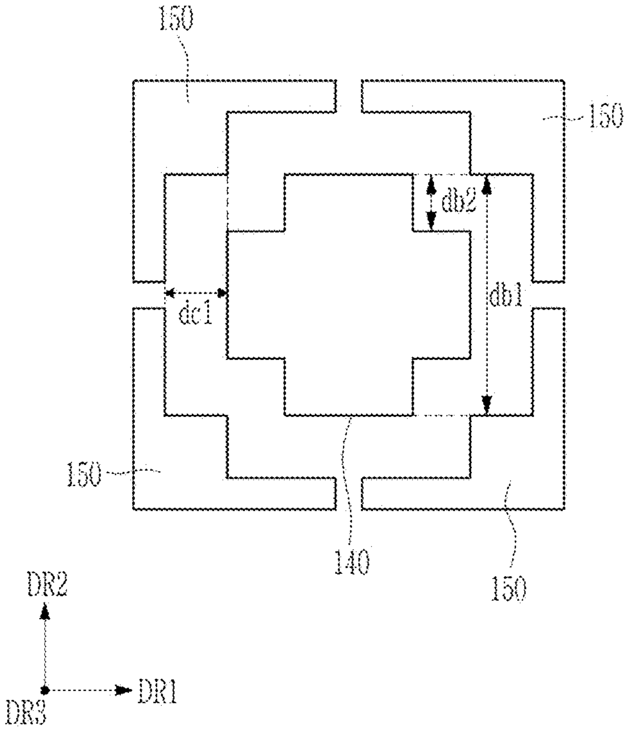
FIG. 12 is a top plan view of a portion of the antenna apparatus of FIG. 8.
Figure 13:
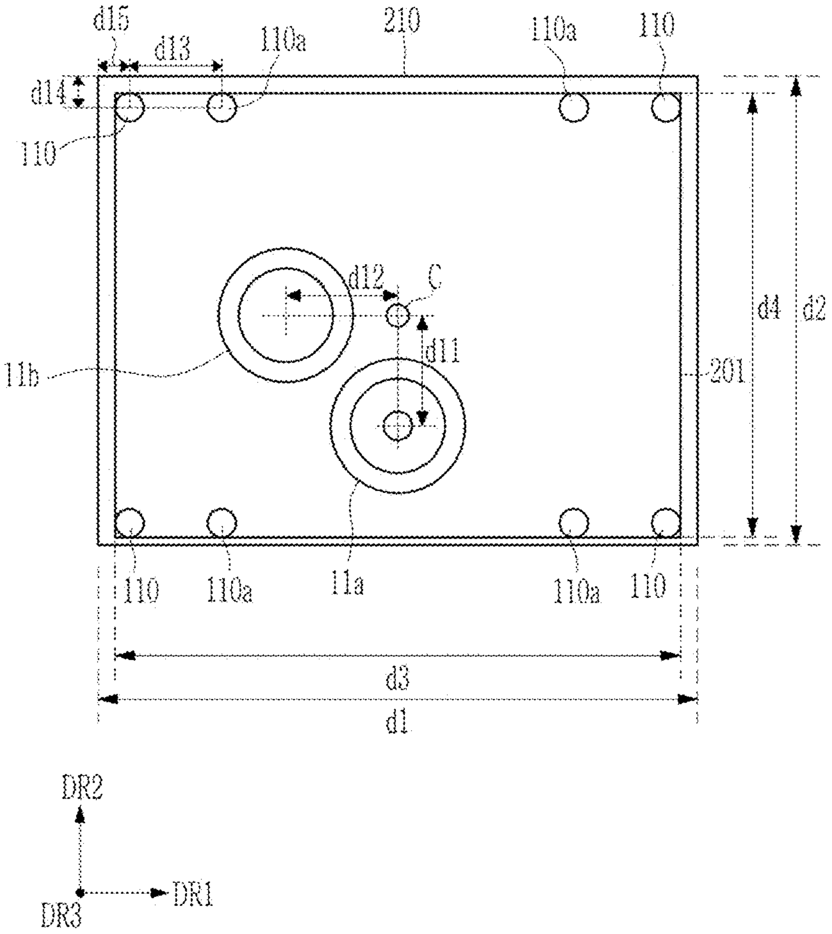
FIG. 13 is a top plan view of a portion of the antenna apparatus of FIG. 8.

Hereinafter, an antenna apparatus 100*b*, according to another embodiment, will be described with reference to FIGS. 8 to 13. FIG. 8 is a perspective view of the antenna apparatus 100*b*. FIG. 9 illustrates a top plan view of the antenna apparatus 100*b*. FIG. 10 is a cross-sectional view of the antenna apparatus 100*b*. FIG. 11 is a top plan view of a portion of the antenna apparatus 100*b*. FIG. 12 is a top plan view of a portion of the antenna apparatus 100*b*. FIG. 13 is a top plan view of a portion of the antenna apparatus 100*b*.

Reference to FIG. 8 to FIG. 13, the antenna apparatus 100*b* is similar, in several aspects, to the antenna apparatus 100 of FIGS. 1 to 6. Accordingly, detailed descriptions of the same constituent elements will be omitted.

Referring to FIGS. 8 to 13, the antenna apparatus 100*b* may include, for example, the first feed via 121*a*, the second feed via 121*b*, the first antenna patch 130, the second antenna patch 140, the third antenna patch 150, the plurality of first vias 110, and the plurality of second vias 110*a*.

The antenna apparatus 100*b* further includes the first dielectric layer 210, the second dielectric layer 220 disposed above the first dielectric layer 210 in the third direction DR3, and the ground plane 201 disposed below the first dielectric layer 210 in the third direction DR3.

The first antenna patch 130, the second antenna patch 140, and the third antenna patch 150 may be disposed between the plurality of layers forming the second dielectric layer 220; the first antenna patch 130 and the second antenna patch 140 overlap each other in the third direction DR3; and the third antenna patch 150 may be disposed at a side of the second antenna patch 140 such that the third antenna patch 150 surrounds the second antenna patch 140.

The first dielectric layer 210 may have the first width d1 in the first direction DR1 and the second width d2 in the second direction DR2, and the first width d1 may be greater than the second width d2. Similarly, the ground plane 201 may have the third width d3 in the first direction DR1 and the fourth width d4 in the second direction DR2, and the third width d3 may be greater than the fourth width d4.

The plurality of first vias 110 may be disposed to be adjacent to four vertices of the ground plane 201. For example, the plurality of first vias 110 may be disposed to be adjacent to corner portions formed by two first sides 201*a* of the ground plane 201 parallel to the first direction DR1 and two second sides 201*b* of the ground plane 201 parallel to the second direction DR2.

The edges of the plurality of first vias 110 may at least partially overlap the first side 201*a* and the second side 201*b* of the ground plane 201 along the third direction DR3.

The plurality of first vias 110 may not overlap the antenna patches 130, 140, and 150 along the third direction DR3.

The plurality of second vias 110*a* are disposed adjacent to the plurality of first vias 110 so as to be spaced apart from the plurality of first vias 110 in the first direction DR1, and are disposed so at to be adjacent to two first sides 201*a* of the ground plane 201 parallel to the first direction DR1. Edges of the plurality of second vias 110*a* may at least partially overlap the first side 201*a* of the ground plane 201 in the third direction DR3.

The plurality of second vias 110*a* may at least partially overlap the third antenna patch 150 in the third direction DR3, but do not overlap the first antenna patch 130 and the second antenna patch 140. However, the plurality of second vias 110*a* may not overlap the third antenna patch 150.

The first feed pattern 122*a* and the second feed pattern 122*b* disposed on the first dielectric layer 210 may be respectively connected to the first feed via 121*a* and the second feed via 121*b* to receive an electrical signal from the first feed via 121*a* and the second feed via 121*b*, respectively. The third feed pattern 123*a* may be connected to the first feed pattern 122*a* to receive an electrical signal through the first feed via 121*a* and the first feed pattern 122*a*. The fourth feed pattern 123*b* may be connected to the second feed pattern 122*b* to receive an electrical signal through the second feed via 121*b* and the second feed pattern 122*b*.

When an electrical signal is applied to the third feed pattern 123*a* and the fourth feed pattern 123*b*, the third feed pattern 123*a* and the fourth feed pattern 123*b* are coupled with the first antenna patch 130 to transmit the electrical signal to the first antenna patch 130.

The second antenna patch 140 overlaps the first antenna patch 130 in the third direction DR3.

When an electrical signal is transmitted to the first antenna patch 130, the first antenna patch 130 and the second antenna patch 140 are coupled, and the electrical signal is transmitted to the second antenna patch 140 by the coupling.

In addition, the third antenna patch 150 is disposed around the second antenna patch 140, and forms an additional coupling with the second antenna patch 140, whereby the second antenna patch 140 and the third antenna patch 150 may form additional impedances, so that bandwidths of the antenna patches 130 and 140 may be increased in size without increasing a size of the second antenna patch 140.

The antenna apparatus 100*b* may transmit and receive the first RF signal having the first polarization through an electrical signal applied by the first feed via 121*a*, and may transmit and receive the second RF signal having the second polarization through an electrical signal applied by the second feed via 121*b*.

The first feed via 121*a* is disposed to be adjacent to an edge of the first dielectric layer 210 parallel to the first direction DR1 so as to be spaced apart from the center C of the ground plane 201 in the second direction DR2. The second feed via 121*b* is disposed to be adjacent to an edge of the first dielectric layer 210 parallel to the second direction DR2 so as to be spaced apart from the center C of the ground plane 201 in the first direction DR1.

The first return current path of the ground plane 201 for the electrical signal applied to the first feed via 121*a* may be substantially parallel to the second direction DR2, and the second return current path of the ground plane 201 for the electrical signal applied to the second feed via 121*b* may be substantially parallel to the first direction DR1. As a width of the second direction DR2 of the antenna apparatus 100*b* decreases, since the fourth width d4 of the ground plane 201 parallel to the second direction DR2 is less than the third width d3 of the ground plane 201 parallel to the first direction DR1, the first return current path of the ground plane 201 for the electrical signal applied to the first feed via 121*a* may be shortened compared to the second return current path of the ground plane 201 for the electrical signal applied to the second feed via 121*b*.

However, the antenna apparatus 100*b* includes the plurality of first vias 110 and the plurality of second vias 110*a*, and the plurality of first vias 110 and the plurality of second vias 110*a* are connected to the ground plane 201. Accordingly, the plurality of first vias 110 and the plurality of second vias 110*a* may provide the first return current paths of the additional ground plane 201.

The plurality of first vias 110 may be disposed adjacent to corner portions formed by the two first sides 201*a* of the ground plane 201 parallel to the first direction DR1 and the two second sides 201*b* of the ground plane 201 parallel to the second direction DR1, and the edges of the plurality of first vias 110 may at least partially overlap the first side 201*a* of the ground plane 201 in the third direction DR3. In addition, the edges of the plurality of first vias 110 may at least partially overlap the second side 201*b* of the ground plane 201 in the third direction DR3.

As such, the plurality of first vias 110 are arranged so that their edges at least partially overlap the two first sides 201*a* of the ground plane 201 parallel to the first direction DR1 at the four corner portions of the ground plane 201. Thus, an additional first return current path through two first vias 110 facing each other along the second direction DR2 and the ground plane 201 may be lengthened.

In addition, the plurality of second vias 110*a* are disposed adjacent to the two first sides 201*a* of the ground plane 201 parallel to the first direction DR1 so as to be spaced apart from the plurality of first vias 110 in a direction parallel to the first direction DR1, so that the edges of the plurality of second vias 110*a* at least partially overlap the first side 201*a* of the ground plane 201 in the third direction DR3. Thus, a distance between the two second vias 110*a* facing each other along the second direction DR2 is increased, and the additional first return current path through the two second vias 110*a* facing each other along the second direction DR2 and the ground plane 201 may be lengthened.

In addition, since the plurality of first vias 110 are arranged so that their edges at least partially overlap the sides of the ground plane 201 at the four corner portions of the ground plane 201, the spacing distance between the plurality of first vias 110 and the antenna patches 130, 140, and 150 is widened. Accordingly, the influence due to the additional coupling between the plurality of first vias 110 and the antenna patches 130, 140, and 150 may be reduced to not affect the resonance pattern of the antenna apparatus 100*b*.

In addition, the plurality of second vias 110*a* may at least partially overlap the third antenna patch 150, but do not overlap the first antenna patch 130 and the second antenna patch 140. As such, since the plurality of second vias 110*a* are disposed to be spaced apart from the first antenna patch 130 and the second antenna patch 140, the influence of the additional coupling between the plurality of second vias 110*a* and the antenna patches 130 and 140 may be reduced to not affect the resonance pattern of the antenna apparatus 100*b*. The plurality of second vias 110*a* may at least partially overlap the third antenna patch 150, which is a parasitic antenna patch that forms additional coupling with the second antenna patch 140, but do not overlap the antenna patches 130 and 140, which are main antenna patches, to not affect the resonance pattern of the apparatus 100*b*.

In addition, referring to FIG. 13 together with FIG. 9, a distance d13 (in a direction parallel to the first direction DR1) between the first via 110 and the second via 110*a* adjacent to each other in a direction parallel to the first direction DR1 may be larger than distances d14 and d15 between the edge of the first dielectric layer 210 and the center of the first via 110. Further, the distance d13 between the first via 110 and the second via 110*a* adjacent to each other may not be larger than a minimum distance d13*a* (in a direction parallel to the first direction the direction DR1) between the first antenna patch 130 and second antenna patch 140 and the second via 110*a* in a direction parallel to the first direction DR1. That is, the second via 110*a* may be disposed closer to the first via 110 than the first antenna patch 130 and the second antenna patch 140 in a direction parallel to the first direction DR1.

As such, since the second vias 110*a* are disposed closer to the first vias 110 than the first antenna patch 130 and the second antenna patch 140, a distance between the second vias 110*a* and the first antenna patch 130 and second antenna patch 140 may be maintained at a predetermined interval or more, and accordingly, the influence of the additional coupling between the plurality of second vias 110*a* and the antenna patches 130 and 140 may be reduced to not affect the resonance pattern of the antenna apparatus 100*b*.

The number of the plurality of second vias 110*a* may be the same as the number of the plurality of first vias 110, but is not limited thereto, and the number of the plurality of second vias 110*a* may be changed. However, it is preferable that each of the plurality of second vias 110*a* is disposed closer to adjacent first vias 110 than the first antenna patch 130 and the second antenna patch 140 in a direction parallel to the first direction DR1.

Additional features of the antenna apparatus 100 of FIGS. 1 to 6 described above are applicable to the antenna apparatus 100*b*.

Figure 14:
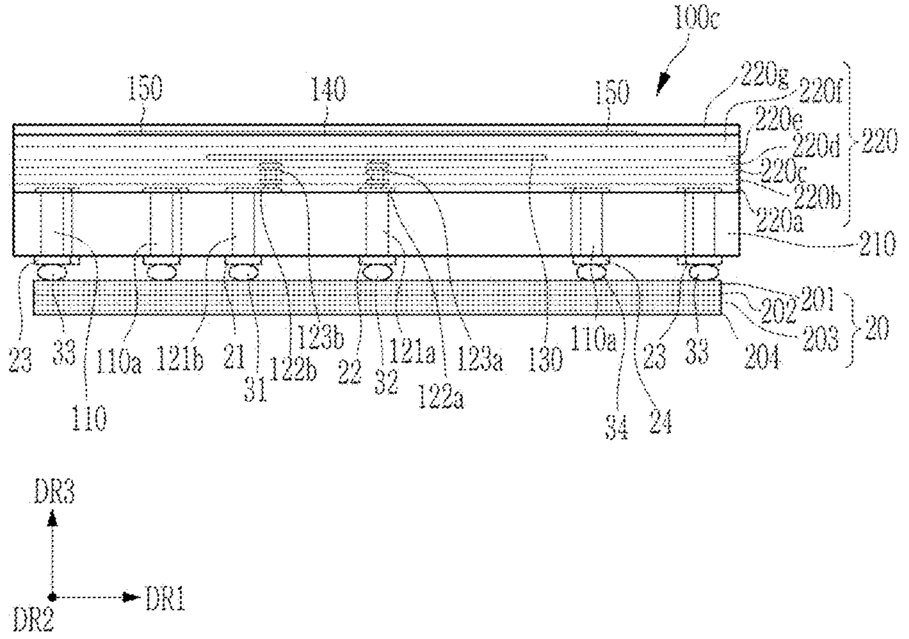
FIG. 14 is a cross-sectional view of an antenna apparatus, according to another embodiment.

FIG. 14 illustrates an antenna apparatus 100*c*, according to another embodiment. Detailed descriptions of the same constituent elements as those of the antenna apparatuses 100 and 100*b* according to the above-described embodiments will be omitted.

Referring to FIG. 14, the antenna apparatus 100*c* includes the plurality of pads 21, 22, and 23 disposed under the first feed via 121*a* and second feed via 121*b* and the plurality of first vias 110, and a plurality of connection members 31, 32, and 33 disposed under the plurality of pads 21, 22, and 23. The plurality of connection members 31, 32, and 33 may be solder balls, pins, or lands.

The antenna apparatus 100*c* may further include the connection substrate 20 that is disposed under the first dielectric layer 210 in the third direction DR3 and includes the ground plane 201.

The first feed via 121*a* and second feed via 121*b* and the plurality of first vias 110 may be electrically connected to the connection substrate 20 through the plurality of pads 21, 22, and 23 and the plurality of connection members 31, 32, and 33. The plurality of second vias 110*a* may be electrically connected to the connection substrate 20 through a pad 24 and a connection member 34 disposed under the pad 24. The connection member 34 may be a solder ball, a pins, or a land.

Unlike the antenna apparatuses 100 and 100*b*, the antenna apparatus 100*c* may have an independent structure separate from the connection member 20 including the ground plane 201.

Generally, features of the antenna apparatus 100 of FIGS. 1 to 6 and of the antenna apparatus 100*b* of FIGS. 8 to 13 are applicable to the antenna apparatus 100*c*, with the exception that, in the antenna apparatus 100*c*, the configuration of the connection substrate 20, the plurality of connection members 31, 32, 33, and 34, and the plurality of pads 21, 22, 23, and 24 described above replaces the configuration of the third dielectric layer 230 of the antenna apparatuses 100 and 100*b*, and the antenna apparatus 100*c* further includes the plurality of second vias 110*a*.

Figure 15:
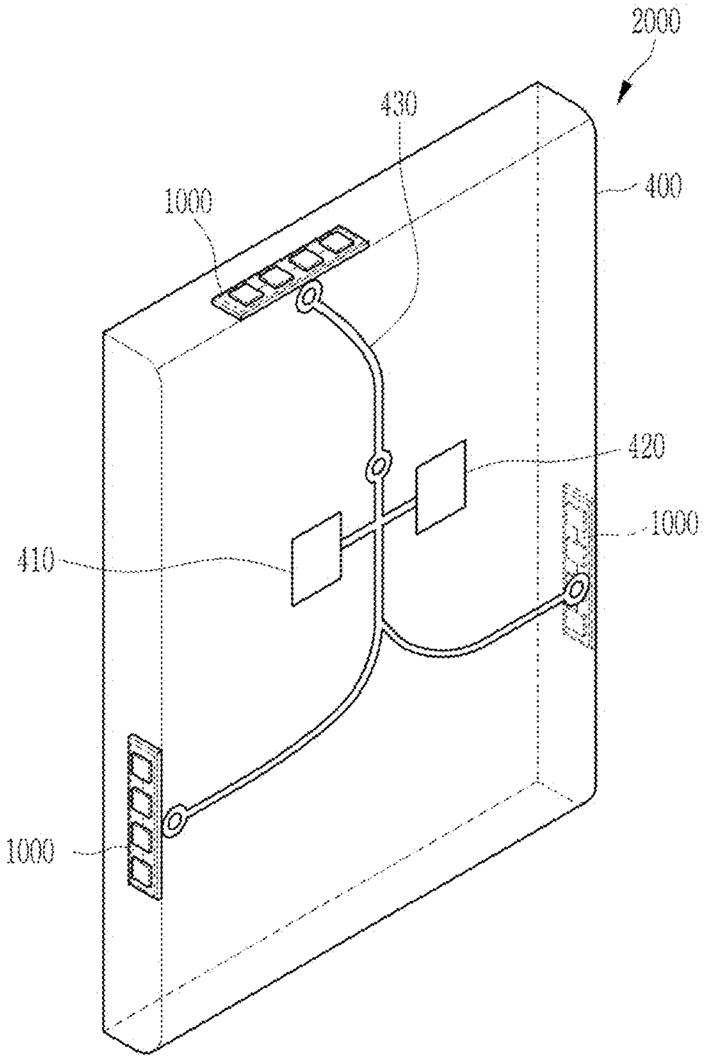
FIG. 15 is a simplified view of an electronic device including an antenna apparatus, according to an embodiment.

FIG. 15 illustrates a simplified view of an electronic device 2000 including an antenna apparatus 1000, according to an embodiment.

Referring to FIG. 15, the antenna apparatus 1000 is disposed in a set 400 of the electronic device 2000.

The electronic device 2000 may be a smart phone, a personal digital assistant, a digital video camera, a digital still camera, a network system, a computer, a monitor, a tablet, a laptop computer, a netbook computer, a television, a video game device, a smart watch, or an automotive part, but is not limited to the listed examples.

The electronic device 2000 may have sides of a polygon, and multiple antenna apparatuses 1000 may be respectively disposed adjacent to at least some of the sides of the electronic device 2000.

A communication module 410 and a baseband circuit 420 may be disposed in the set 400, and the antenna apparatus 1000 may be electrically connected to the communication module 410 and the baseband circuit 420 through a coaxial cable 430.

In order to perform digital signal processing, the communication module 410 may include any one or any combination of any two or more of a memory chip such as a volatile memory (for example, a DRAM), a non-volatile memory (for example, a ROM), and a flash memory; an application processor chip such as a central processor (for example, a CPU), a graphics processor (for example, a GPU), a digital signal processor, a cryptographic processor, a microprocessor, and a microcontroller; and a logic chip such as an analog-to-digital converter and an application-specific IC (ASIC).

The baseband circuit 420 may perform analog-to-digital conversion, and amplification, filtering, and frequency conversion on an analog signal to generate a base signal. The base signal, which is input to/output from the baseband circuit 420, may be transmitted to the antenna apparatus 1000 through a cable. For example, the base signal may be transmitted to an IC through an electrical connection structure, a core via, and a wire, and the IC may convert the base signal into an RF signal in a millimeter wave (mmWave) band.

Each antenna apparatus 1000 may be a device in which a plurality of antenna apparatuses 100, 100*a*, 100*b*, and/or 100*c* according to the above-described embodiments are arranged, respectively.

Figure 16:
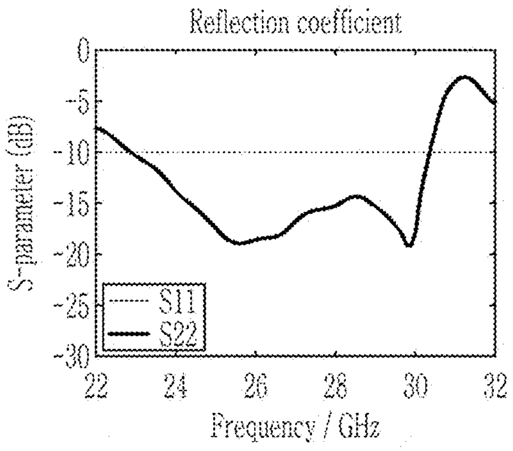
FIG. 16 and FIG. 17 are graphs of results according to an experimental example.
Figure 17:
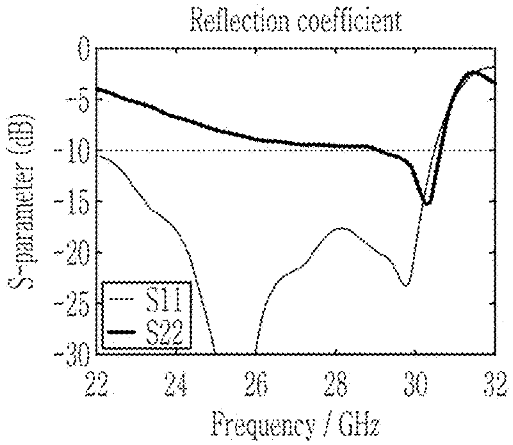

Hereinafter, an experimental example will be described with reference to FIGS. 16 and 17. FIG. 16 and FIG. 17 are graphs of results according to an experimental example.

In the experimental example of FIGS. 16 and 17, for a first case in which the first width d1 of the dielectric of the antenna parallel to the first direction DR1 and the second width d2 thereof parallel to the second direction DR2 were substantially equal to each other, and for a second case in which the first width d1 of the dielectric of the antenna parallel to the first direction DR1 was greater than the second width d2 thereof parallel to the second direction DR2, as in an antenna apparatus according to an embodiment disclosed herein, the reflection coefficient of the first RF signal having the first polarization and the reflection coefficient of the second RF signal having the second polarization were measured. The results of the measurements are shown in FIGS. 16 17. FIG. 16 illustrates the results of the first case, and FIG. 17 illustrates the results of the second case. In the graphs, an S-parameter of the first RF signal is shown as S22, and an S-parameter of the second RF signal is shown as S11.

Referring to FIG. 16, in the first case in which the first width d1 of the dielectric of the antenna parallel to the first direction DR1 and the second width d2 thereof parallel to the second direction DR2 were substantially equal to each other, it was found that the S-parameter of the first RF signal and the S-parameter of the second RF signal were substantially the same and coincided with each other. As such, in the first case, it was found that there was no difference between the reflection coefficients of the first RF signal and the second RF signal.

Referring to FIG. 17, according to the second case in which the first width d1 of the dielectric of the antenna parallel to the first direction DR1 was greater than the second width d2 thereof parallel to the second direction DR2, as in an antenna apparatus according to an embodiment disclosed herein, it was found that the S-parameter of the first polarization RF signal and the S-parameter of the second polarization RF signal were different from each other. Particularly, it was found that the bandwidth of the first polarization RF signal was considerably smaller than the bandwidth of the second polarization RF signal. As such, it was found that as the width of the second direction DR2 of the antenna apparatus 100 decreased, since the fourth width d4 of the ground plane 201 parallel to the second direction DR2 was less than the third width d3 of the ground plane 201 parallel to the first direction DR1, the reflection coefficient characteristic of the first polarization RF signal might be lowered, and accordingly, the bandwidth of the first polarization RF signal might be lowered.

Figure 18A:
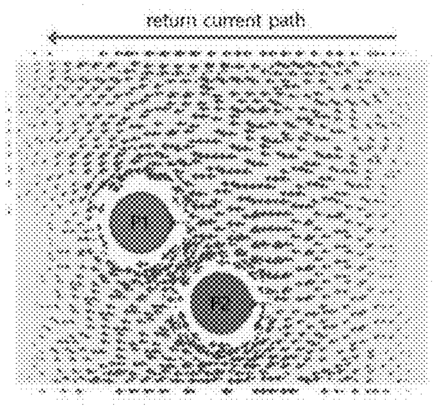
FIGS. 18A and 18B are graphs of results according to an experimental example.
Figure 18B:
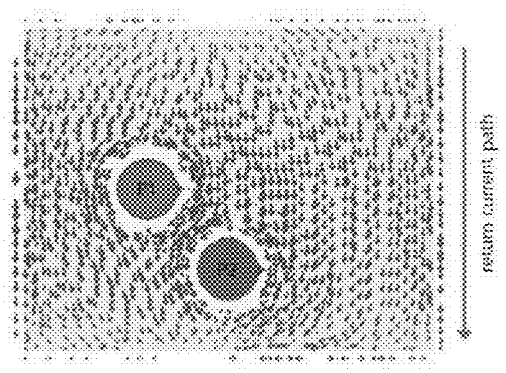

Hereinafter, another experimental example will be described with reference to FIGS. 18A and 18B. FIGS. 18A and 18B are graphs of results, according to another experimental example.

In the experimental example of FIGS. 18A and 18B, for a case in which the first width d1 of the dielectric of the antenna parallel to the first direction DR1 was greater than the second width d2 thereof parallel to the second direction DR2, as in an antenna apparatus according to an embodiment disclosed herein, when electrical signals were applied to each of the first feed via 121*a* and the second feed via 121*b*, the return current path of the ground plane 201 was simulated. The results of the simulation are shown in FIGS. 18A and 18B.

FIG. 18A shows the second return current path of the ground plane 201 with respect to an electrical signal applied to a second feed via P1. FIG. 18B shows the first return current path of the ground plane 201 with respect to an electrical signal applied to a first feed via P2.

Referring to FIGS. 18A and 18B, it was found that the first return current path of the ground plane 201 for the electrical signal applied to the first feed via 121*a* was substantially parallel to the second direction DR2, and it was found that the second return current path of the ground plane 201 for the electrical signal applied to the second feed via 121*b* was substantially parallel to the first direction DR1. In addition, it was found that the first return current path of the ground plane 201 for the electrical signal applied to the first feed via 121*a* was shorter than the second return current path of the ground plane 201 for the electrical signal applied to the second feed via 121*b*.

Figure 19:
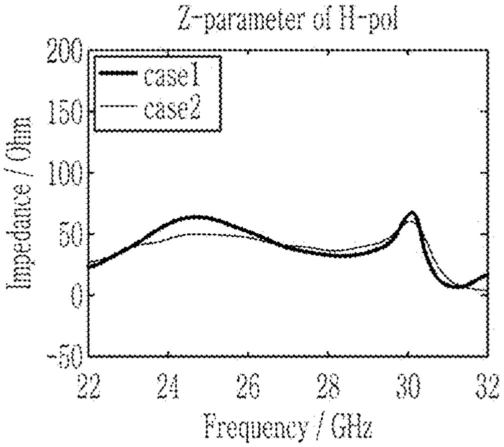
FIG. 19 and FIG. 20 are graphs of results according to an experimental example.
Figure 20:
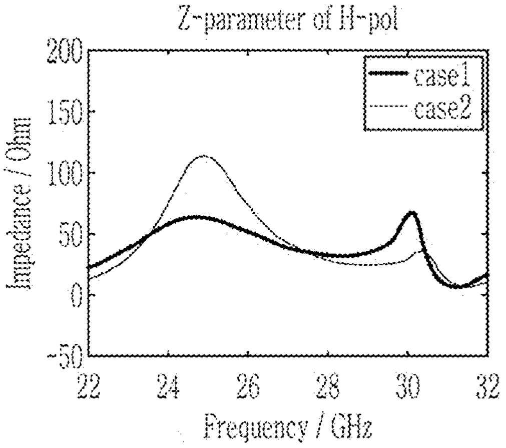

Hereinafter, another experimental example will be described with reference to FIGS. 19 and 20. FIGS. 19 and 20 are graphs of results according to an experimental example.

In the example of FIGS. 19 and 20, for the first case (case 1) in which the first width d1 of the dielectric of the antenna parallel to the first direction DR1 and the second width d2 thereof parallel to the second direction DR2 were substantially equal to each other, and for the second case (case 2) in which the first width d1 of the dielectric of the antenna parallel to the first direction DR1 was greater than the second width d2 thereof parallel to the second direction DR2 as in an antenna apparatus according to an embodiment disclosed herein, the impedance of the first RF signal having the first polarization and the impedance of the second RF signal having the second polarization were measured. The results of the measurements are shown in FIGS. 19 20. FIG. 19 shows the results of the second RF signal, and FIG. 20 shows the results of the first RF signal.

Referring to FIG. 19, for the first case (case 1) and the second case (case 2), it was found that the impedances according to the frequencies of the second RF signal had substantially the same pattern, and. Thus, comparing the first case (case 1) and the second case (case 2), it was found that the second RF signal was not affected.

Referring to FIG. 20, for the first case (case 1) and the second case (case 2), it was found that the impedances according to the frequencies of the first RF signal were different from each other, and it was found that as the width of the dielectric of the antenna in the direction parallel to the second direction DR2 decreased, the characteristics of the first RF signal decreased.

Figure 21:
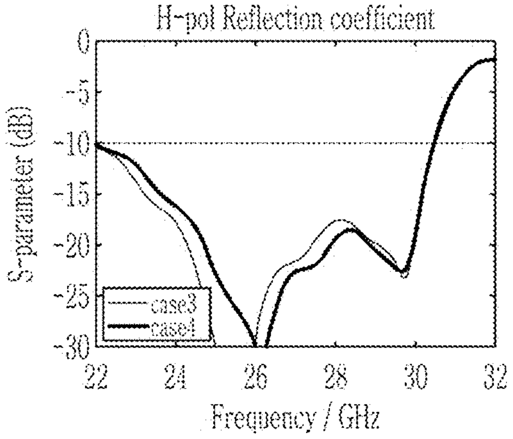
FIG. 21 to FIG. 23 are graphs of results according to an experimental example.
Figure 22:
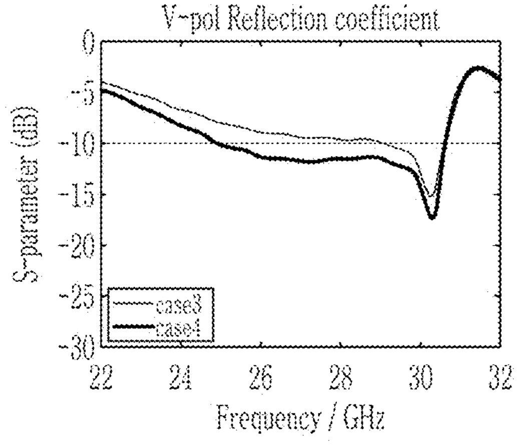
Figure 23:
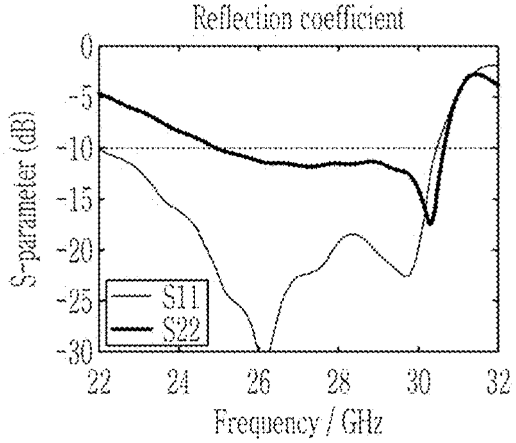

Hereinafter, another experimental example will be described with reference to FIGS. 21 to 23. FIGS. 21 to 23 are graphs of results according to an experimental example.

In the example of FIGS. 21 to 23, as in an antenna apparatus according an embodiment disclosed herein, for a third case (case 3) in which the first width d1 of the dielectric of the antenna parallel to the first direction DR1 was greater than the second width d2 thereof parallel to the second direction DR2, and the first vias 110 were not formed, and for a fourth case (case 4) in which the first vias 110 were formed, the reflection coefficients of the first RF signal having the first polarization and the second RF signal having the second polarization were measured. The results of the measurements are shown in FIGS. 21 to 23. FIG. 21 shows the results of the second RF signal, and FIG. 22 shows the results of the first RF signal. FIG. 23 shows the first RF signal and the second RF signal for the fourth case (case 4). In FIG. 23, the result of the second RF signal is shown as S11, and the result of the first RF signal is shown as S22.

Referring to FIG. 21, it was found that the bandwidths of the second polarization RF signal had substantially no difference from the third case (case 3) and the fourth case (case 4). Referring to FIG. 22, it was found that the bandwidth of the first polarization RF signal was increased in the fourth case (case 4) compared to the third case (case 3).

Referring to FIG. 23, in the fourth case (case 4) including a plurality of vias as in the antenna apparatuses, according to an embodiment disclosed herein, it was found that the bandwidth of the first RF signal did not differ significantly from the bandwidth of the second polarization RF signal.

Figure 24A:
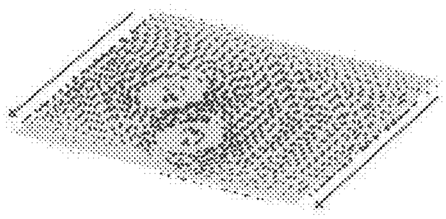
FIGS. 24A and 24B are a schematic views of results according to an experimental example.
Figure 24B:
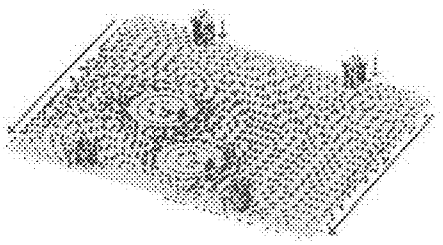

Hereinafter, another experimental example will be described with reference to FIGS. 24A and 24B. FIGS. 24A and 24B are schematic views of results according to another experimental example.

In the experimental example of FIGS. 24A and 24B, as in an antenna apparatus according to an embodiment disclosed herein, for the third case (case 3) in which the first width d1 of the dielectric of the antenna parallel to the first direction DR1 was greater than the second width d2 thereof parallel to the second direction DR2, and the first vias 110 were not formed, and for the fourth case (case 4) in which the first vias 110 were formed, when each electrical signal was applied to the first feed via 121*a*, the return current path of the ground plane 201 was simulated. The results of the simulation are shown in FIGS. 24A and 24B. FIG. 24A shows the result of the third case (case 3), and FIG. 24B shows the result of the fourth case (case 4).

Referring to FIGS. 24A and 24B, in the fourth case (case 4) compared to the third case (case 3), it was found that the first return current path of the ground plane 201 parallel to the second direction DR2 for the electrical signal applied to the first feed via 121*a* through the first vias 110 was increased.

Figure 25A:
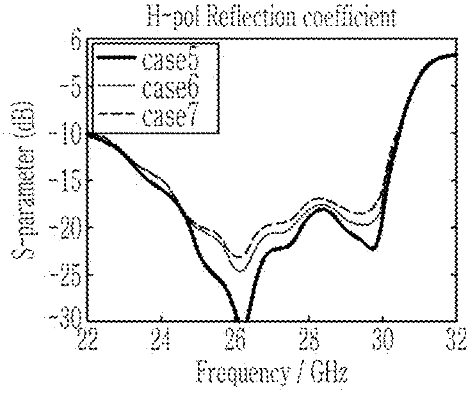
FIGS. 25A and 25B are graphs of results according to an experimental example.
Figure 25B:
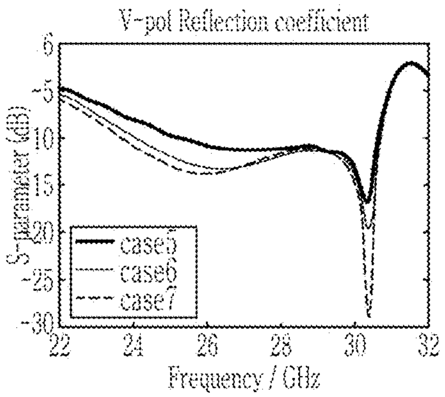

Hereinafter, another experimental example will be described with reference to FIGS. 25A and 25B. FIGS. 25A and 25B are graphs of results of another experimental example.

In the experimental example of FIGS. 25A and 25B, for a fifth case (case 5) in which a plurality of vias connected to the ground plane were formed at a position overlapping the edge of the ground plane, for a sixth case (case 6) in which the plurality of vias were formed to be spaced about 0.5 mm apart from the edge of the ground plane in a direction parallel to the first direction DR1, and for a seventh case (case 7) in which the plurality of vias were formed to be spaced about 0.8 mm apart from the edge of the ground plane in the direction parallel to the first direction DR1, the S-parameters of the first RF signal having the first polarization and the S-parameters of the second RF signal having the second polarization were measured. The results of the measurements are shown in FIGS. 25A and 25B. FIG. 25A shows the results of the second RF signal, and FIG. 25B shows the results of the first RF signal.

Referring to FIGS. 25A and 25B, it was found that even when the positions of the plurality of vias were changed from the edge of the ground plane in the direction parallel to the first direction DR1, there was no change in the bandwidth of the second RF signal. In contrast, it was found that when the positions of the plurality of vias were changed from the edge of the ground plane in the direction parallel to the first direction DR1, the greater the position change, the wider the bandwidth of the first RF signal was. Therefore, it was found that when the plurality of second vias were formed together with the plurality of first vias, as in the antenna apparatuses 100*b* and 100*c* according to the embodiment, the bandwidth of the first polarization RF signal was wider.

Figure 26A:
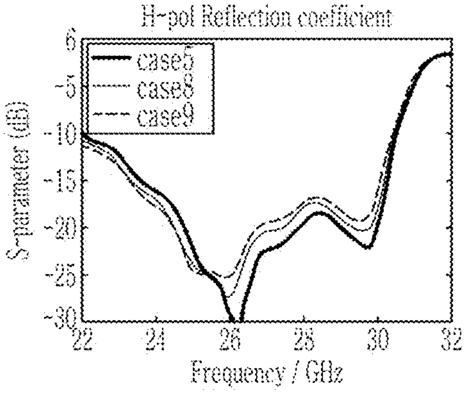
FIGS. 26A and 26B are graphs of results according to an experimental example.
Figure 26B:
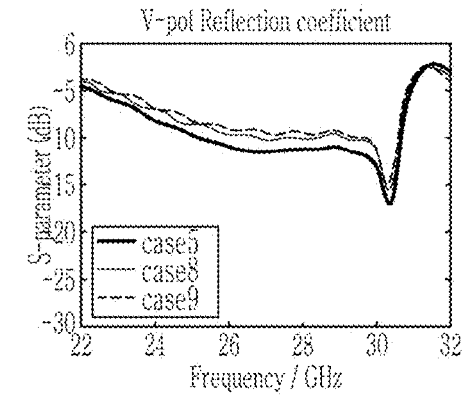

Hereinafter, another experimental example will be described with reference the first FIGS. 26A and 26B. FIGS. 26A and 26B are graphs of results of another experimental example.

In the experimental example of FIGS. 26A and 26B, for the fifth case (case 5) in which a plurality of vias connected to the ground plane were formed at a position overlapping the edge of the ground plane, for an eighth case (case 8) in which the plurality of vias were formed to be spaced about 0.5 mm apart from the edge of the ground plane in a direction parallel to the second direction DR2, and for a ninth case (case 9) in which the plurality of vias were formed to be spaced about 0.8 mm apart from the edge of the ground plane in the direction parallel to the second direction DR2, the S-parameters of the first polarization RF signal and the S-parameters of the second polarization RF signal were measured. The results of the measurements are shown in FIGS. 26A and 26B. FIG. 26A shows the results of the second RF signal having the second polarization, and FIG. 26B shows the results of the first RF signal having the first polarization.

Referring to FIGS. 26A and 26B, it was found that even when the positions of the plurality of vias were changed from the edge of the ground plane in the direction parallel to the second direction DR2, the change in the bandwidth of the second RF signal was not large. In contrast, it was found that when the positions of the plurality of vias were changed from the edge of the ground plane in the direction parallel to the second direction DR2, the bandwidth of the first RF signal further decreased as the position change increased. Therefore, as in the antenna apparatuses 100, **100*a*, 100*b*, and 100*c* according to embodiments disclosed herein, it was found that when the vias 110 and 110*a* facing each other in the direction parallel to the second direction DR2** were widely disposed without reducing the distance therebetween, the bandwidth of the first RF signal was wider.

Figure 27:
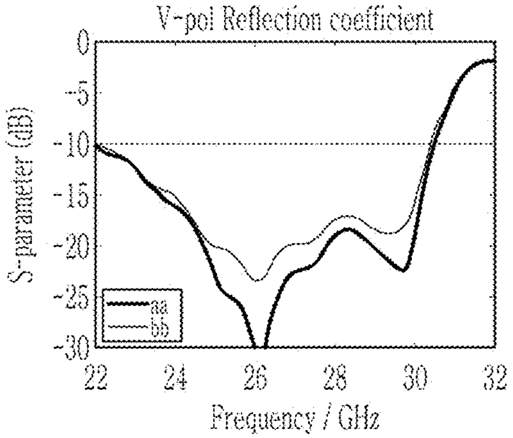
FIG. 27 and FIG. 28 are graphs of results according to an experimental example.
Figure 28:
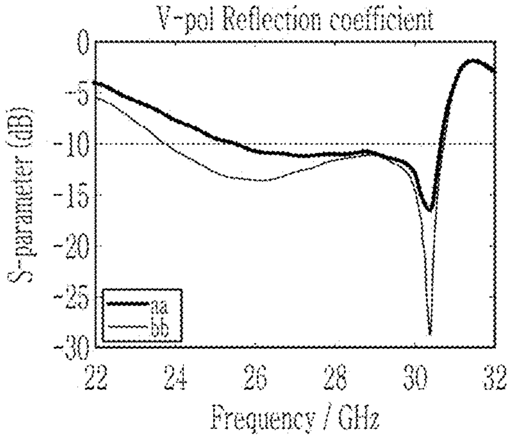

Hereinafter, another experimental example will be described with reference to FIGS. 27 and 28. FIGS. 27 and 28 are graphs of results of another experimental example.

In the experimental example of FIGS. 27 and 28, as in an antenna apparatus according an embodiment disclosed herein, for a case in which the first width d1 of the dielectric of the antenna parallel to the first direction DR1 was greater than the second width d2 thereof parallel to the second direction DR2 and the plurality of first vias 110 were formed, and for a case in which the plurality of first vias 110 and the plurality of second vias **110*a* were formed together, the S-parameters of the first RF signal having the first polarization and the second RF signal having the second polarization were measured. The results of the measurements are shown in FIGS. 27 and 28. FIG. 27 shows the results of the second RF signal, and FIG. 28 shows the results of the first RF signal. In FIGS. 27 and 28, the results of a case in which only the plurality of first vias 110 were formed are shown as a graph (aa), and the results of a case in which the plurality of first vias 110 and the plurality of second vias 110*a*** were formed together are shown as a graph (bb).

Referring to FIG. 27, it was found that the change in the bandwidth of the second RF signal due to including the plurality of second vias **110*a* was not large. In contrast, referring to FIG. 28, it was found that the bandwidth of the first RF signal in the case (bb) in which the plurality of first vias 110 and the plurality of second vias 110*a* were formed together was wider than the bandwidth of the first RF signal in the case (aa) in which only the plurality of first vias 110** were formed.

Hereinafter, results of another experimental example will be described with reference to FIGS. 29A and 29B. FIG. 29 illustrates a graph of results according to another experimental example.

Figure 29A:
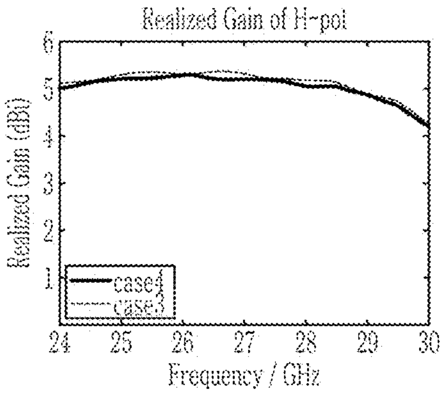
FIGS. 29A and 29B are graphs of results according to an experimental example.
Figure 29B:
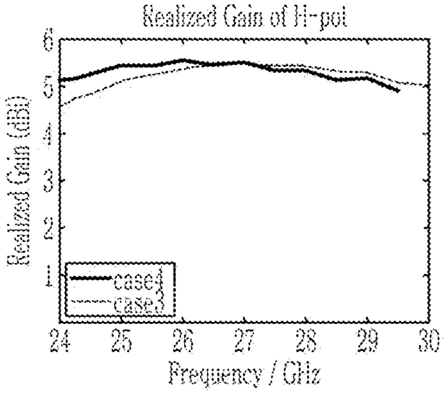

In the experimental example of FIGS. 29A and 29B, as in an antenna apparatus according to an embodiment disclosed herein, for the third case (case 3) in which the first width d1 of the dielectric of the antenna parallel to the first direction DR1 was larger than the second width d2 of the dielectric of the antenna parallel to the second direction DR2, and the first vias 110 were not formed, and for the fourth case (case 4) in which the first vias 110 were formed, the gains of the first RF signal having the first polarization and the second RF signal having the second polarization were measured. The results of the measurements are shown in FIGS. 29A and 29B. FIG. 29A shows the gains of the second RF signal, and FIG. 29B shows the gains of the first RF signal.

Referring to FIGS. 29A and 29B, it was found that there was no significant difference between the gain of the second RF signal in the case in which the first vias 110 were formed and the gain of the second RF signal in the case in which the first vias 110 were not formed, but the gain of the first RF signal increased when the first vias 110 were formed.

Another experimental example will be described with reference to Table 1 below. In the experimental example of Table 1, the bandwidths and gains of the first and second RF signals of the case in which the plurality of first vias were not formed and the case in which the plurality of vias first were formed were measured. The results of the measurements are shown in Table 1.

TABLE 1

| Classification | Polarization characteristic | Before formation of vias | After formation of vias |
|---|---|---|---|
| Bandwidth (GHz) (Reflection coefficient −10 dB) | First polarization | 29 to 30.6 | 23.6 to 30.7 |
| | Second polarization | 21.7 to 30.4 | 21.9 to 30.4 |
| Gain (dBi) (24.25 GHz to 29.5 GHz) | First polarization | 4.76 to 5.51 | 4.92 to 5.3 |
| | Second polarization | 4.76 to 5.36 | 4.65 to 5.3 |

Referring to Table 1, it was found that the bandwidth of the first RF signal significantly increased from 1.6 GHz before formation of the plurality of first vias to 7.1 GHz after formation of the plurality of first vias, and the gain of the first RF signal increased in the 24 GHz band after formation of the plurality of first vias.

The communication module 410 in FIGS. 1 to 29B that performs the operations described in this application is implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 29B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

DESCRIPTION OF SYMBOLS

100, 100*a*, 100*b*, 100*c*: antenna apparatus
201: ground plane
210, 220: dielectric layer
121*a*, 121*b*: feed via
110, 110*a*: via
130, 140, 150: antenna patch

What is claimed is:

1. An antenna apparatus, comprising:

a ground plane including first sides parallel to a first direction and second sides parallel to a second direction, on a plane formed in the first direction and the second direction;

a dielectric layer disposed on the ground plane in a third direction;

an antenna patch overlapping the ground plane in the third direction; and vias connected to the ground plane and configured to pass through at least a portion of the dielectric layer, wherein edges of the vias at least partially overlap the first sides of the ground plane in a top view of the plane formed in the first direction and the second direction, and wherein a length of each of the first sides in the first direction is greater than a length of each of the second sides in the second direction.

2. The antenna apparatus of claim 1, wherein a plurality of first vias of the vias are disposed to be adjacent to portions at which the first sides of the ground plane and the second sides of the ground plane cross each other.

3. The antenna apparatus of claim 2, wherein the plurality of first vias do not overlap the antenna patch along the third direction.

4. The antenna apparatus of claim 3, wherein the antenna patch includes:

a first antenna patch disposed on the dielectric layer along the third direction;

a second antenna patch overlapping the first antenna patch in the third direction; and a third antenna patch disposed on a same layer as the second antenna patch, and disposed around the second antenna patch, and wherein the plurality of first vias do not overlap the first antenna patch and the second antenna patch in the third direction.

5. The antenna apparatus of claim 2, further comprising:

a first feed via and a second feed via that pass through at least a portion of the dielectric layer in the third direction and are spaced apart from a center of the ground plane in the second direction and the first direction, wherein the antenna apparatus is configured such that a first signal having a first polarization is transmitted and received by an electrical signal applied to the first feed via, and a second signal having a second polarization is transmitted and received by an electrical signal applied to the second feed via.

6. The antenna apparatus of claim 2, wherein:

the plurality of first vias are connected to the ground plane, pass through at least a portion of the dielectric layer, and are disposed to be spaced apart from a plurality of second vias of the vias in a direction parallel to the first direction.

7. The antenna apparatus of claim 6, wherein edges of the plurality of first vias at least partially overlap the first sides of the ground plane in the third direction.

8. The antenna apparatus of claim 7, wherein the antenna patch includes:

a first antenna patch disposed on the dielectric layer in the third direction;

a second antenna patch overlapping the first antenna patch along in third direction; and a third antenna patch disposed on a same layer as the second antenna patch and disposed around the second antenna patch, and wherein the plurality of first vias do not overlap the first antenna patch and the second antenna patch in the third direction.

9. The antenna apparatus of claim 8, wherein the plurality of second vias at least partially overlap the third antenna patch in the third direction.

10. The antenna apparatus of claim 7, wherein a first distance between the plurality of second vias and the plurality of first vias in a direction parallel to the first direction is not greater than a minimum distance between the plurality of first vias and the antenna patch in the direction parallel to the first direction.

11. The antenna apparatus of claim 1, wherein the dielectric layer includes a first edge parallel to the first direction and a second edge parallel to the second direction, and wherein a width of the first edge is greater than a width of the second edge.

12. The antenna apparatus of claim 1, wherein a top surface of the vias is disposed below the antenna patch when viewed in the third direction.

13. An antenna apparatus, comprising:

a ground plane including first sides parallel to a first direction and second sides parallel to a second direction, on a plane formed in the first direction and the second direction;

a dielectric layer overlapping the ground plane in a third direction;

an antenna patch overlapping the ground plane in the third direction;

a plurality of first vias configured to pass through at least a portion of the dielectric layer and connected to the ground plane; and a plurality of second vias disposed to be spaced apart from the plurality of first vias in the first direction, wherein a first distance between the plurality of first vias and the plurality of second vias in a direction parallel to the first direction is not greater than a minimum distance between the plurality of second vias and the antenna patch in the direction parallel to the first direction, wherein edges of the first vias and the second vias at least partially overlap the first sides of the ground plane in a top view of the plane formed in the first and second directions, wherein the dielectric layer includes a first edge parallel to the first direction and a second edge parallel to the second direction, and wherein a length of each of the first sides in the first direction is longer than a length of each of the second sides in the second direction.

14. The antenna apparatus of claim 13, wherein the plurality of first vias do not overlap the antenna patch in the third direction.

15. The antenna apparatus of claim 14, further comprising:

a first feed via and a second feed via that pass through at least a portion of the dielectric layer in the third direction and are spaced from a center of the ground plane in the second direction and the first direction, wherein the antenna patch includes:

a first antenna patch coupled with the first feed via and the second feed via;

a second antenna patch overlapping the first antenna patch in the third direction; and a third antenna patch disposed on a same layer as the second antenna patch and disposed around the second antenna patch, wherein the plurality of first vias do not overlap the first antenna patch and the second antenna patch in the third direction, and wherein the plurality of second vias do not overlap the first antenna patch and the second antenna patch in the third direction.

16. The antenna apparatus of claim 14, wherein the plurality of second vias at least partially overlap the third antenna patch in the third direction.

17. The antenna apparatus of claim 13, wherein a width of the first edge is greater than a width of the second edge.

18. The antenna apparatus of claim 13, further comprising:

a first feed via and a second feed via that pass through at least a portion of the dielectric layer in the third direction and are spaced from a center of the ground plane in the second direction and the first direction, wherein the antenna apparatus is configured such that a first signal having a first polarization is transmitted and received by an electrical signal applied to the first feed via, and a second signal having a second polarization is transmitted and received by an electrical signal applied to the second feed via.

19. The antenna apparatus of claim 13, wherein a number of the plurality of first vias and a number of the plurality of second vias are the same.

20. The antenna apparatus of claim 13, wherein top surfaces of the plurality of first vias and the plurality of second vias are disposed below the antenna patch when viewed in the third direction.

* * * * *